(12) United States Patent
Yu et al.

(10) Patent No.: US 9,004,739 B2
(45) Date of Patent: Apr. 14, 2015

(54) BACKLIGHT MODULE

(71) Applicant: Shenzhen China Star Optoelectronics Technology Co., Ltd., Shenzhen, Guangdong (CN)

(72) Inventors: Gang Yu, Shenzhen (CN); Yubo Gu, Shenzhen (CN); Liuyang Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 344 days.

(21) Appl. No.: 13/704,004

(22) PCT Filed: Oct. 26, 2012

(86) PCT No.: PCT/CN2012/083526
§ 371 (c)(1),
(2) Date: Dec. 13, 2012

(87) PCT Pub. No.: WO2014/056264
PCT Pub. Date: Apr. 17, 2014

(65) Prior Publication Data
US 2014/0185315 A1    Jul. 3, 2014

(30) Foreign Application Priority Data

Oct. 12, 2012    (CN) .......................... 2012 1 0387284

(51) Int. Cl.
*F21V 7/04*    (2006.01)
*F21V 8/00*    (2006.01)
*G02F 1/13*    (2006.01)

(52) U.S. Cl.
CPC ................ *G02B 6/0081* (2013.01); *G02F 1/13* (2013.01)

(58) Field of Classification Search
USPC ................ 362/97.1, 294, 607, 611, 632–634; 349/58, 65
See application file for complete search history.

(56) References Cited

U.S. PATENT DOCUMENTS

| 8,905,620 B2 * | 12/2014 | Yu et al. ........................ 362/633 |
| 2013/0141894 A1 * | 6/2013 | Yu et al. ...................... 362/97.2 |

FOREIGN PATENT DOCUMENTS

| CN | 101198228 A | 6/2006 |
| CN | 2842487 Y | 11/2006 |
| CN | 201032505 Y | 3/2008 |
| CN | 102193219 A | 9/2011 |
| CN | 102393578 A | 3/2012 |
| JP | 2008164803 A | 7/2008 |
| JP | 2010101984 A | 5/2010 |

* cited by examiner

*Primary Examiner* — Stephen F Husar
(74) *Attorney, Agent, or Firm* — Andrew C. Cheng

(57) ABSTRACT

The present invention provides a backlight module, which includes a backplane, a backlight source arranged inside the backplane, a reflector plate arranged inside the backplane, a light guide plate arranged on the reflector plate, and a mold frame mounted to the backplane. The mold frame forms a projection. The backplane forms a retention slot corresponding to the projection. The projection and the retention slot mate each other through interference fitting, whereby with the interference fitting between the projection and the retention slot, the mold frame is fixedly connected to the backplane. The backlight module uses a projection formed on the mold frame and a retention section formed in the backplane to mate the projection through interference fitting pawl section so as to fixedly mount the mold frame to the backplane through interference-fitting connection thereby showing a simple structure, being easy to assemble, effectively saving time, and thus controlling the cost.

10 Claims, 1 Drawing Sheet

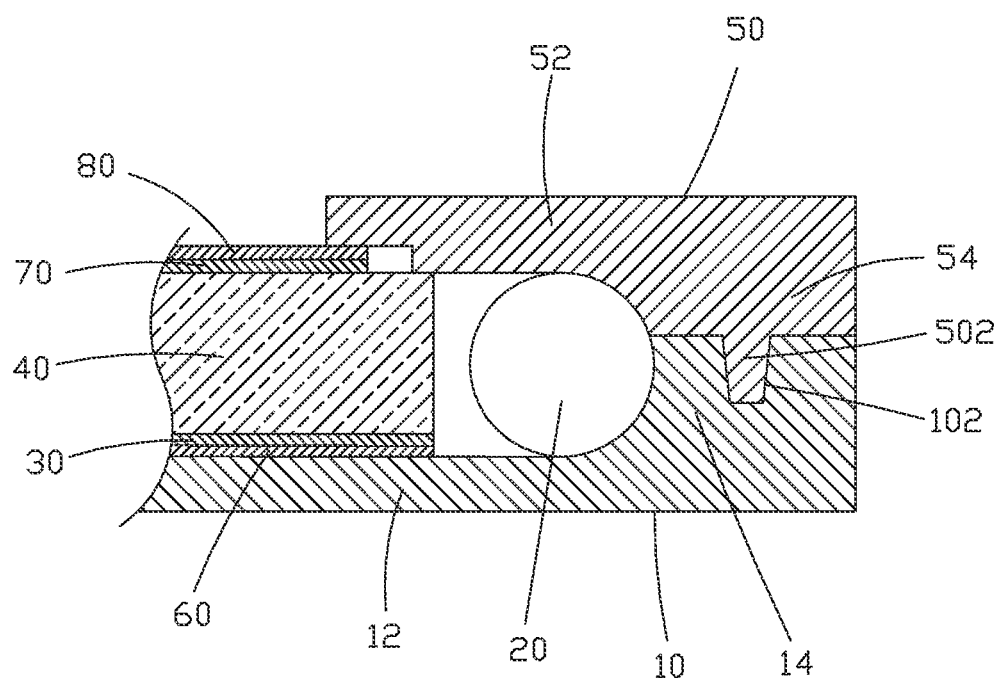

BACKLIGHT MODULE

BACKGROUND OF THE INVENTION

1. Field of the Invention

The present invention relates to the field of liquid crystal displaying, and in particular to a backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires are arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlight source of LED light bar arranged at an edge of a backplane to be located rearward of one side of the liquid crystal panel. The LED light bar emits light that enters a light guide plate (LGP) through a light incident face of the light guide plate and is projected out through a light emergence face of the light guide plate, after being reflected and diffused, to thereby transmit through an optic film assembly and form a planar light source for the liquid crystal panel.

A conventional side-edge backlight module comprises a backplane, a backlight source arranged inside the backplane, a reflector plate arranged inside the backplane, a light guide plate arranged above the reflector plate, an optic film assembly arranged on the light guide plate, and a mold frame mounted to the backplane. The backplane and the mold frame are often fixed together through bolts. Such a process of assembling requires the use of a separate tool so that assembling and disassembling are both difficult and consume work hours.

SUMMARY OF THE INVENTION

An object of the present invention is to provide a backlight module, which comprises a backplane and a mold frame that are assembled and fixed together through interference-fitting connection, showing a simple structure and being easy to assemble.

To achieve the object, the present invention provides a backlight module, which comprises a backplane, a backlight source arranged inside the backplane, a reflector plate arranged inside the backplane, a light guide plate arranged on the reflector plate, and a mold frame mounted to the backplane. The mold frame forms a projection. The backplane forms a retention slot corresponding to the projection. The projection and the retention slot are mateable with each other through interference fitting, whereby with the interference fitting between the projection and the retention slot, the mold frame is fixedly connected to the backplane.

The projection has a cross-section that is of a trapezoidal shape.

The retention slot has a shape corresponding to the shape of the projection and the retention slot has a size that is smaller than size of the projection.

The backplane comprises a bottom board and a first side board.

The retention section is formed in the first side board.

The mold frame comprises a top board and a second side board.

The projection is formed on an end face of a free end of the second side board.

The backlight module further comprises a heat dissipation plate arranged under the reflector plate, a diffusion plate arranged on the light guide plate, and a prism plate arranged on the diffusion plate.

The backlight source comprises a linear light source.

The present invention also provides a backlight module, which comprises a backplane, a backlight source arranged inside the backplane, a reflector plate arranged inside the backplane, a light guide plate arranged on the reflector plate, and a mold frame mounted to the backplane, the mold frame forming a projection, the backplane forming a retention slot corresponding to the projection, the projection and the retention slot being mateable with each other through interference fitting, whereby with the interference fitting between the projection and the retention slot, the mold frame is fixedly connected to the backplane; and wherein the projection has a cross-section that is of a trapezoidal shape;

wherein the retention slot has a shape corresponding to the shape of the projection and the retention slot has a size that is smaller than size of the projection;

wherein the backplane comprises a bottom board and a first side board;

wherein the retention section is formed in the first side board;

wherein the mold frame comprises a top board and a second side board;

wherein the projection is formed on an end face of a free end of the second side board;

further comprising a heat dissipation plate arranged under the reflector plate, a diffusion plate arranged on the light guide plate, and a prism plate arranged on the diffusion plate; and wherein the backlight source comprises a linear light source.

The efficacy of the present invention is that the present invention provides a backlight module, which comprises a mold frame forming a projection and a backplane forming a retention section that mates the projection through interference fitting so as to fixedly mount the mold frame to the backplane through interference-fitting connection thereby showing a simple structure, being easy to assemble, effectively saving time, and thus controlling the cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawing. In the drawing:

FIG. 1 is a schematic view showing the structure of a backlight module of the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIG. 1, the present invention provides a backlight module, which comprises a backplane 10, a backlight source 20 arranged inside the backplane 10, a reflector plate 30 arranged inside the backplane 10, a light guide plate 40 arranged on the reflector plate 30, and a mold frame 50 mounted to the backplane 10. The mold frame 50 forms a projection 502. The backplane 10 forms a retention slot 102 corresponding to the projection 502. The projection 502 and the retention slot 102 mate each other through interference fitting, whereby with the interference fitting between the projection 502 and the retention slot 102, the mold frame 50 is fixedly connected to the backplane 10.

In the instant embodiment, the projection 502 has a cross-section that is of a trapezoidal shape. The retention slot 102 has a shape corresponding to the shape of the projection 502, but the retention slot 102 has a size that is slightly smaller than the size of the projection 502. To assemble, the mold frame 50 is directly pressed down toward the backplane 10 to have the projection 502 fit into the retention slot 102 in such a way that interference fitting is established between the projection 502 and the retention slot 102 thereby fixedly connecting the mold frame 50 to the backplane 10. The process of mounting is simple and time can be saved.

The backplane 10 comprises a bottom board 12 and a first side board 14. The retention slot 102 is formed in the first side board 14. The mold frame 50 comprises a top board 52 and a second side board 54. The projection 502 is formed on an end face of a free end of the second side board 54.

The backlight module according to the present invention also comprises a heat dissipation plate 60 arranged under the reflector plate 30, a diffusion plate 70 arranged on the light guide plate 40, and a prism plate 80 arranged on the diffusion plate 70. The backlight source 20 comprises a linear light source, which emits light of which a portion directly transmits through an incidence surface of the light guide plate 40 to enter the interior of the light guide plate 40 and a remaining portion is reflected by the reflector plate 30 to get into the light guide plate 40. The light propagates through the light guide plate 40 as being simultaneously subjected to total reflection and refraction and is further subjected to diffusion through the diffusion plate 70 and the prism plate 80 to thereby provide a uniformly distributed planar light source.

In summary, the present invention provides a backlight module, which comprises a mold frame forming a projection and a backplane forming a retention section that mates the projection through interference fitting so as to fixedly mount the mold frame to the backplane through interference-fitting connection thereby showing a simple structure, being easy to assemble, effectively saving time, and thus controlling the cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane, a backlight source arranged inside the backplane, a reflector plate arranged inside the backplane, a light guide plate arranged on the reflector plate, and a mold frame mounted to the backplane, the mold frame forming a projection, the backplane forming a retention slot corresponding to the projection, the projection and the retention slot being mateable with each other through interference fitting, whereby with the interference fitting between the projection and the retention slot, the mold frame is fixedly connected to the backplane.

2. The backlight module as claimed in claim 1, wherein the projection has a cross-section that is of a trapezoidal shape.

3. The backlight module as claimed in claim 1, wherein the retention slot has a shape corresponding to the shape of the projection and the retention slot has a size that is smaller than size of the projection.

4. The backlight module as claimed in claim 1, wherein the backplane comprises a bottom board and a first side board.

5. The backlight module as claimed in claim 4, wherein the retention section is formed in the first side board.

6. The backlight module as claimed in claim 1, wherein the mold frame comprises a top board and a second side board.

7. The backlight module as claimed in claim 6, wherein the projection is formed on an end face of a free end of the second side board.

8. The backlight module as claimed in claim 1 further comprising a heat dissipation plate arranged under the reflector plate, a diffusion plate arranged on the light guide plate, and a prism plate arranged on the diffusion plate.

9. The backlight module as claimed in claim 1, wherein the backlight source comprises a linear light source.

10. A backlight module, comprising a backplane, a backlight source arranged inside the backplane, a reflector plate arranged inside the backplane, a light guide plate arranged on the reflector plate, and a mold frame mounted to the backplane, the mold frame forming a projection, the backplane forming a retention slot corresponding to the projection, the projection and the retention slot being mateable with each other through interference fitting, whereby with the interference fitting between the projection and the retention slot, the mold frame is fixedly connected to the backplane; and
wherein the projection has a cross-section that is of a trapezoidal shape;
wherein the retention slot has a shape corresponding to the shape of the projection and the retention slot has a size that is smaller than size of the projection;
wherein the backplane comprises a bottom board and a first side board;
wherein the retention section is formed in the first side board;
wherein the mold frame comprises a top board and a second side board;
wherein the projection is formed on an end face of a free end of the second side board;
further comprising a heat dissipation plate arranged under the reflector plate, a diffusion plate arranged on the light guide plate, and a prism plate arranged on the diffusion plate; and
wherein the backlight source comprises a linear light source.

* * * * *